(No Model.)

G. C. HINMAN.
PERCH HOLDER FOR BIRD CAGES.

No. 367,395. Patented Aug. 2, 1887.

Witnesses
J. G. Heylmun.
J. T. Cross.

Inventor
George C. Hinman
By his Attorney Allen Webster

UNITED STATES PATENT OFFICE.

GEORGE C. HINMAN, OF SPRINGFIELD, MASSACHUSETTS.

PERCH-HOLDER FOR BIRD-CAGES.

SPECIFICATION forming part of Letters Patent No. 367,395, dated August 2, 1887.

Application filed April 8, 1885. Serial No. 161,562. (No model.)

*To all whom it may concern:*

Be it known that I, GEORGE C. HINMAN, a citizen of the United States of America, residing at Springfield, in the county of Hampden and State of Massachusetts, have invented new and useful Improvements in Perch-Holders for Bird-Cages, of which the following is a specification, reference being had to the accompanying drawings.

My invention relates to supporting or holding means for bird-perches which are removable from the cage from the outside without inserting the hand inside the cage; and the objects of my invention are to provide a bird-perch which, while being of cheap and simple construction, will support the perch from one end, and which may be readily removed or inserted in place without placing the hand inside the cage, and which may be inserted in various parts of the cage without any previous preparation of the cage to receive the same, and which cannot be thrust too far into the cage between the bars. I attain these objects by the devices herein illustrated and described.

My invention consists of a shaft, a stop plate or disk of greater diameter than the distance between the adjacent cage-wires, and a latch to pass between the cage-wires and engage them when the perch is revolved, and in the application of a stop which, while allowing the perch to be inserted in place, will prevent its being thrust too far between the cage-bars; and, finally, it consists in the general construction and arrangement whereby the beneficial objects of my invention are attained.

Figure 1:
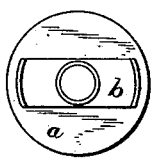
Figure 2:
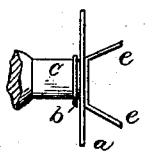
Figure 3:
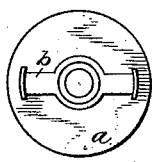
Figure 4:
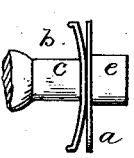
Figure 5:
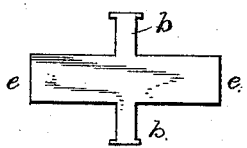
Figure 6:
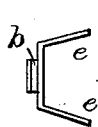
Figure 7:
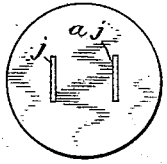
Figure 8:
Figure 9:
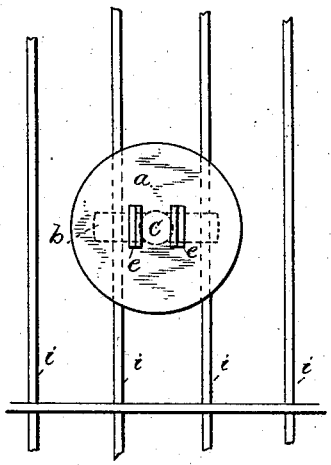
Figure 10:
Figure 11:
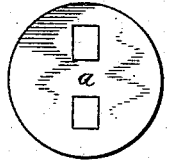

In the accompanying drawings, in which like letters of reference indicate like parts, Figures 1 and 2 are side and edge views of one of the simplest and preferred forms of construction. Figs. 3 and 4 are like views of the same with a slight modification in the form of latch. Figs. 5, 6, 7 are views showing the details of construction, wherein the latch and finger pieces are made from one piece of metal. Fig. 8 is a view of a perch-rod. Fig. 9 is a view of a section of a cage having my device in place. Fig. 10 is a view of another modification in the construction, and Fig. 11 is a view of the same when turned to present the side of the disk.

Reference being had to the drawings, the letter *a* represents a stop-disk; *b*, a latch or piece adapted to pass between the cage-bars when held perpendicularly, and of a length to engage with the cage-bars when in position, the method of application being to turn the device a quarter-turn (more or less) after the latch-piece is passed between the bars and the stop bears against them on the outside.

In Fig. 2 is shown a side view of the device with finger-pieces *e*, which are grasped when the perch is inserted in or removed from the cage.

In Fig. 3 I have illustrated a modification differing slightly from that shown in Fig. 1. In the form seen in Fig. 3 the outer ends or tips of the latch-piece are bent inwardly to facilitate its engaging the cage-bars more readily.

It will be seen by reference to Fig. 5 that the latch-piece *b* is projected from both sides of the central piece, *e*, which, being bent to the form shown in Fig. 6, may be thrust through the slots *j* in the stop, and the perch being fastened in its holder, the whole forms a compact, cheap, and easily-operated device.

The construction of the device is, as before stated, substantially as illustrated in the drawings. The stop or disk, finger-piece or handle, socket, and latch are preferably of brass, and are soldered, riveted, or otherwise fastened together, as shown. The socket is of the diameter and length to hold the perch firmly in place. This is secured to the stop-disk at one side, and the handle or finger-pieces extended from the stop or disk at the other side. The latch or piece, which is passed between the cage-wires and engages them, projects at the base of the socket, as shown.

To operate the device it is simply necessary, as before pointed out, to pass the perch and parts attached between the wires into the cage until the stop bears against the outside of the cage, when the device is turned either to the right or left until the latch engages the cage-wires sufficiently to hold the perch with the requisite degree of firmness.

One of the principal objections heretofore to perches or perch-supporters has been the difficulty and inconvenience found in inserting and removing the same, and where an attempt has been made to construct a device which enabled a perch to be inserted into the cage between the bars from the outside, it is found that the perch and supporter are very liable to be thrust too far into the cage, and great care is required to stop the device in the exact position required for the holding device to engage with the cage-bars. Especially is this objection seen in those devices, attempted to be made practicable, which require to be turned when inserted for the purpose of bringing the holding device to a position to be locked to the cage-bars. To overcome this difficulty I provide a stop of such an area as will prevent its passage between the cage-bars when the perch is inserted. This, it will readily be seen, enables the user to place the device in position in an instant, as it is only necessary to thrust the perch into the cage until the stop bears against the outside of the cage, when the locking device is released or caused to act, and no special care is required to adjust the device to a position for the locking device to engage with the cage-bars.

I prefer to use a disk for the stop, but other forms may of course be used, which, if having the requisite surface to be presented against the outside of the cage, will accomplish the desired result; and I do not therefore limit myself to a stop as illustrated in the drawings.

It will be seen that other forms of latch-piece or locking device than those shown by me may be used with my stop, and the benefits derived from its use be thus attained without departing from my invention.

Although I deem the form illustrated by me in Figs. 1 and 2 the best, because the simplest, yet if a stop device of sufficient size be combined with a perch and locking device of other forms of construction the advantageous results accomplished by me may be attained without departing from the principle of my invention. I prefer to fasten the perch in place by inserting one end in a socket, c, adapted to receive it, though other methods of securing the perch to the holder may be resorted to. It will also be seen that any kind of a handle or finger-piece may be attached as may suit the fancy of the manufacturer or user.

I am aware that a perch-holder has been heretofore made consisting of a block or piece which is inserted between the cage-wires, and is held in place by the cage-wires springing into grooves in said piece. This, however, has no stop to prevent its being inserted too far into the cage. I am also aware that a perch-holding device has been heretofore made which consists of a plate locked to the inside of the cage, to which the perch is secured by a spring-connection. In this, however, the plate becomes a permanent fixture secured to the cage, and it is necessary to insert the hand inside the cage to remove or insert the perch.

I am also aware that a food-holder has been heretofore devised, as shown in United States Letters Patent to S. E. Tompkins, numbered 160,853, in which the modification of the holding device is illustrated as adapted to grasp the wire in a V-shaped opening. The whole of this device, however, when turned or revolved a quarter-turn, will pass through the cage-bars; and the advantage I attain by the application of my stop over devices, similar in construction to this device, is one of the principal objects of my invention.

I am also aware of United States Letters Patent Nos. 241,940 and 173,935, and I make no claim to the construction therein shown.

The main feature of my invention consists in the application of a stop of such area or size on its face or side which bears against the cage as to prevent its passage between the bars, to a perch and latch or locking means constructed to engage with the cage-bars, whereby the perch may be readily placed in position by thrusting it into the cage between the bars from the outside until the stop bears against the cage on the outside, then locking it in position by causing the latch or locking pieces to engage with the bars.

Having therefore described my invention, what I claim, and desire to secure by Letters Patent in this application, is—

1. The combination of a perch-rod, a stop, $a$, having an area sufficient to prevent its passage between adjacent cage-bars when presented flatwise, and a locking means, as $b$, to engage the cage-bars on the inside of the cage, substantially as shown, whereby a removable adjustable bird-perch is constructed.

2. The combination of a stop piece or plate, $a$, having a diameter greater in all directions across its face than the distance between two adjacent cage-wires in the cage in which it is to be used, a perch-rod secured thereto, and a means to lock the plate $a$ to the cage on the outside, consisting of a latch-piece, $b$, constructed to pass between the cage-wires and bear against them on the inside of the cage when the disk is turned a quarter-turn, substantially as shown, and for the purpose stated.

3. A cage-perch consisting of a shaft, a stop plate or disk of greater diameter than the distance between two adjacent cage-wires, and a latch-piece to pass between the cage-wires and engage with them when the perch is revolved a quarter-turn.

4. The combination of a perch-rod with a stop having slots or openings, and a latch device and handle or finger-piece formed of one and the same piece, a portion of which is bent and passed through the slots or openings in the stop.

GEORGE C. HINMAN.

Witnesses:
FRANK H. BOWEN,
ALLEN WEBSTER.